Aug. 20, 1940.  E. BOECKING  2,211,808
DRIVING AND SYNCHRONIZING MECHANISM FOR MOTION PICTURE PROJECTORS
Filed Aug. 6, 1938  5 Sheets-Sheet 2
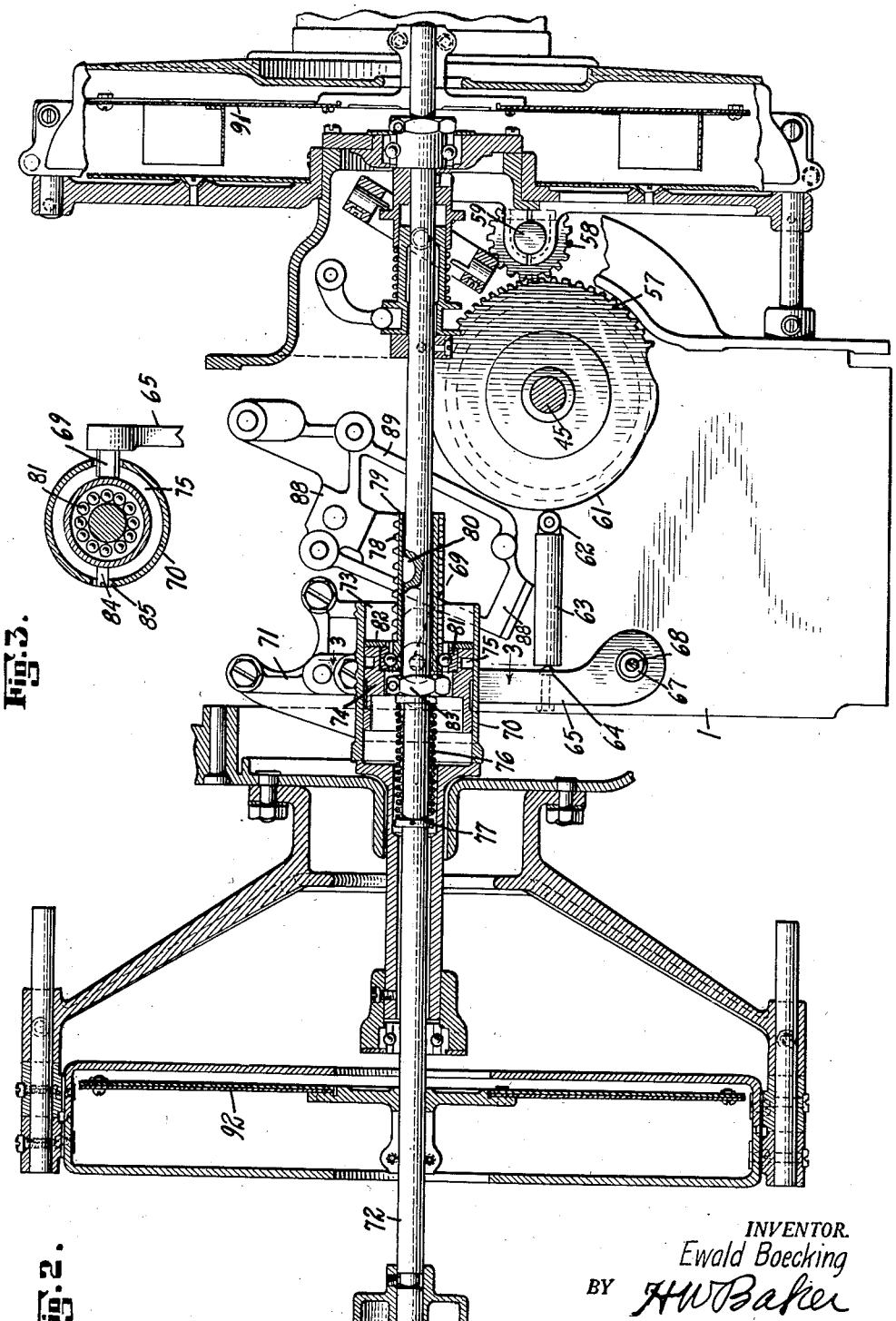
INVENTOR.
Ewald Boecking
BY H. W. Baker
ATTORNEYS.

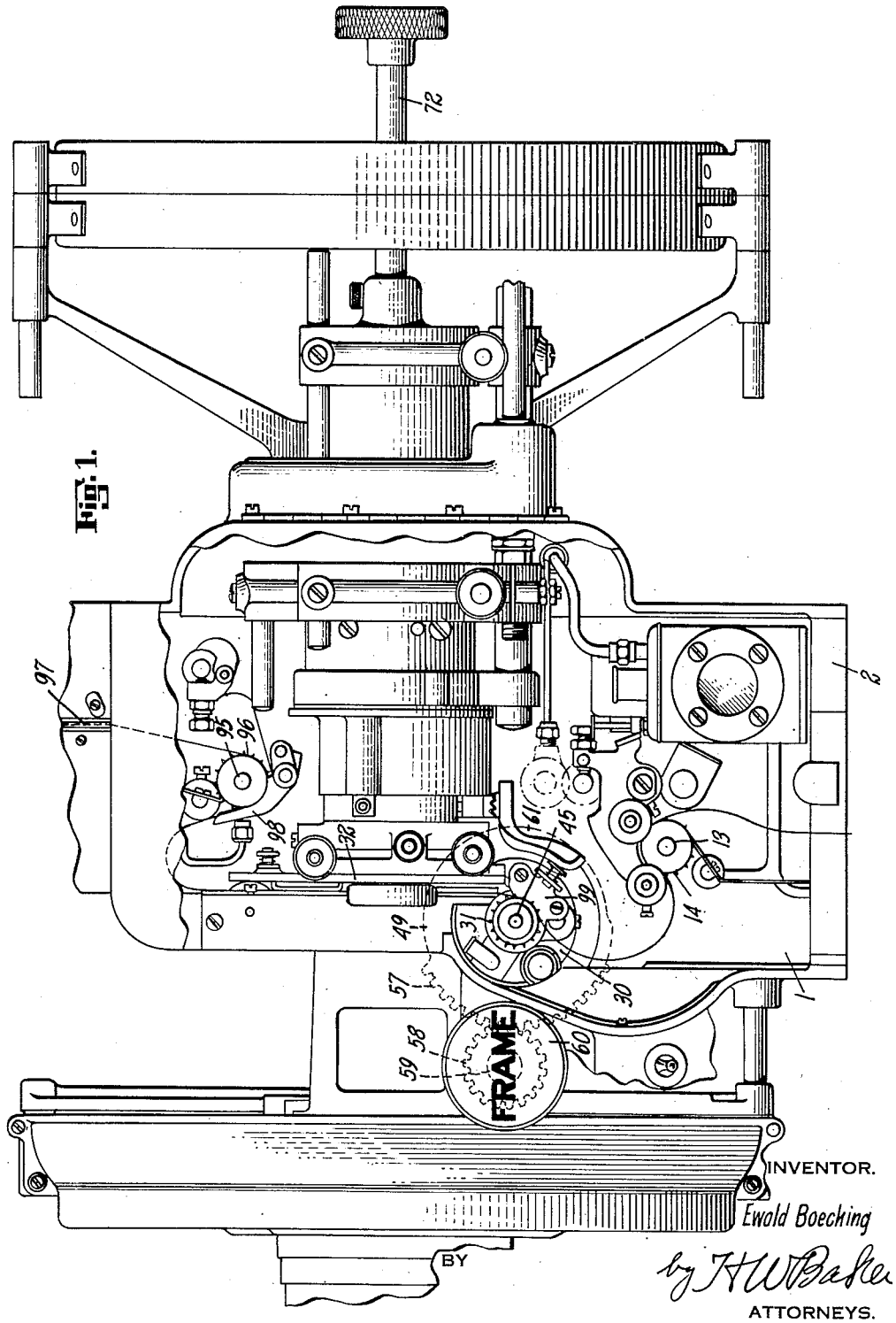

Aug. 20, 1940.　　　　E. BOECKING　　　　2,211,808
DRIVING AND SYNCHRONIZING MECHANISM FOR MOTION PICTURE PROJECTORS
Filed Aug. 6, 1938　　　5 Sheets-Sheet 3

INVENTOR.
Ewald Boecking
BY H.W.Baker
ATTORNEYS.

Aug. 20, 1940.  E. BOECKING  2,211,808
DRIVING AND SYNCHRONIZING MECHANISM FOR MOTION PICTURE PROJECTORS
Filed Aug. 6, 1938  5 Sheets-Sheet 4

INVENTOR.
Ewald Boecking
BY H.W.Baker
ATTORNEYS.

Aug. 20, 1940.  E. BOECKING  2,211,808
DRIVING AND SYNCHRONIZING MECHANISM FOR MOTION PICTURE PROJECTORS
Filed Aug. 6, 1939  5 Sheets-Sheet 5
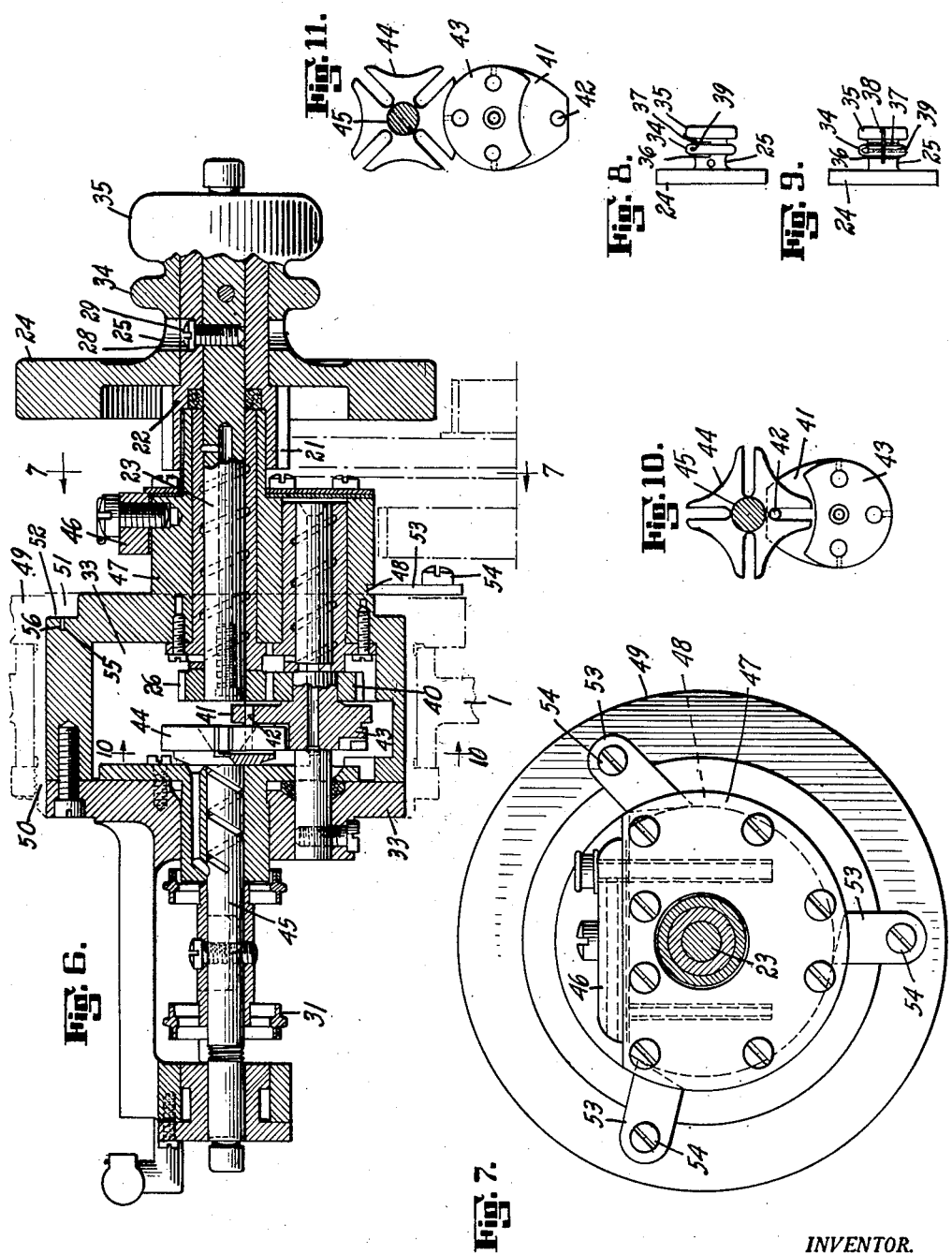

Patented Aug. 20, 1940

2,211,808

UNITED STATES PATENT OFFICE 2,211,808

DRIVING AND SYNCHRONIZING MECHANISM FOR MOTION PICTURE PROJECTORS

Ewald Boecking, Great Kills, Staten Island, N. Y., assignor to International Projector Corporation, New York, N. Y., a corporation of Delaware Application August 6, 1938, Serial No. 223,479

10 Claims. (Cl. 88—18)

This invention is an improvement over the driving and synchronizing mechanism shown in the patent to A. Dina, No. 1,854,504, issued April 19, 1932.

One of the objects of the invention is to provide an improved driving mechanism for the various moving parts of a motion picture projector.

Another object of the invention is to make all of the parts readily removable so that maintenance costs will be reduced.

Another object of the invention is the novel synchronizing mechanism which gives permanently a sharp picture and whereby travel ghost will be eliminated regardless of the amount of wear of the various parts.

Another object of the invention is to synchronize the framing mechanism with the driving mechanism for the shutter so that the two mechanisms may be adjusted synchronously.

Another object of the invention is to provide an intermittent mechanism which is readily removable which thereby facilitates maintenance labor and costs.

Figure 4:
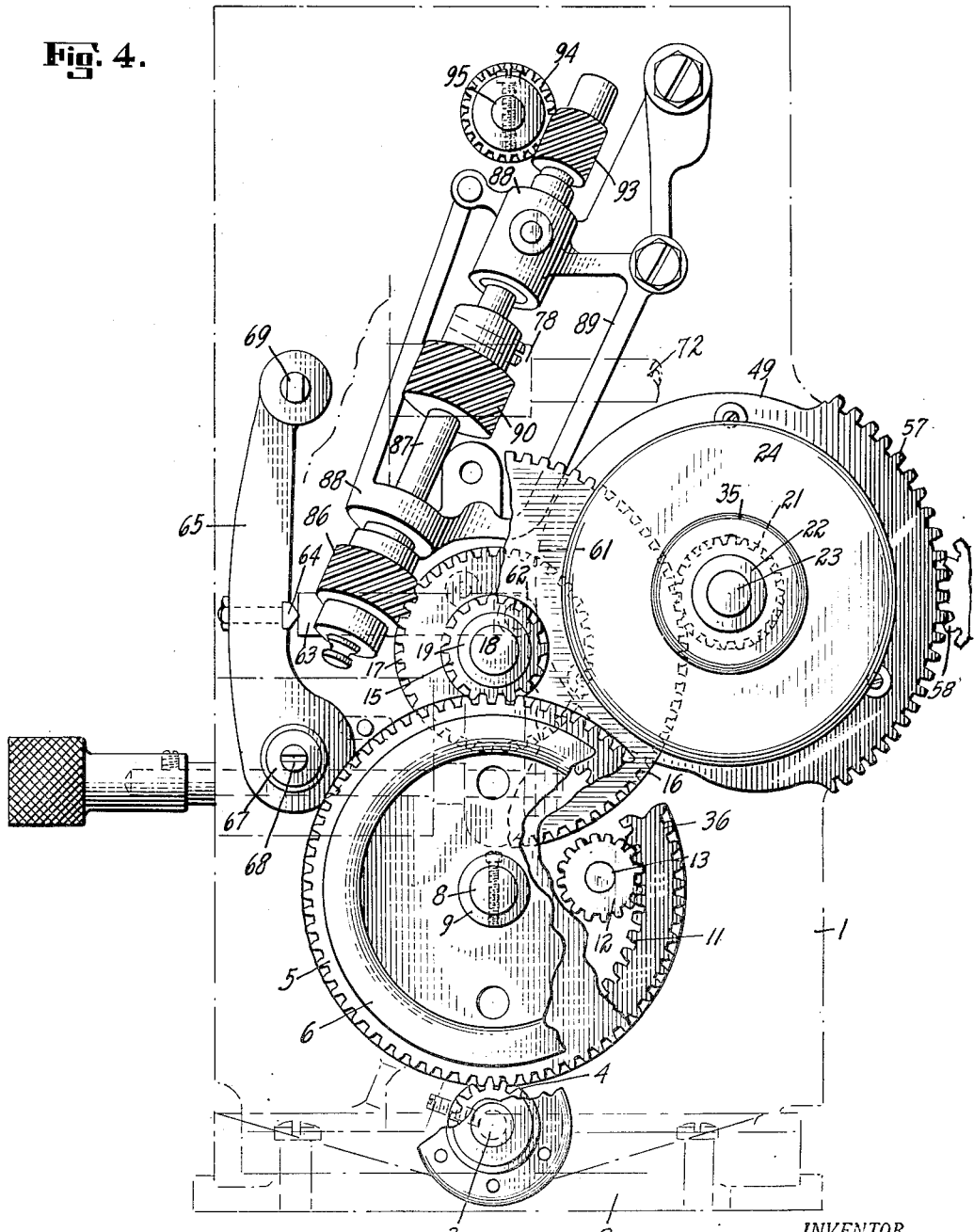
Figure 5:
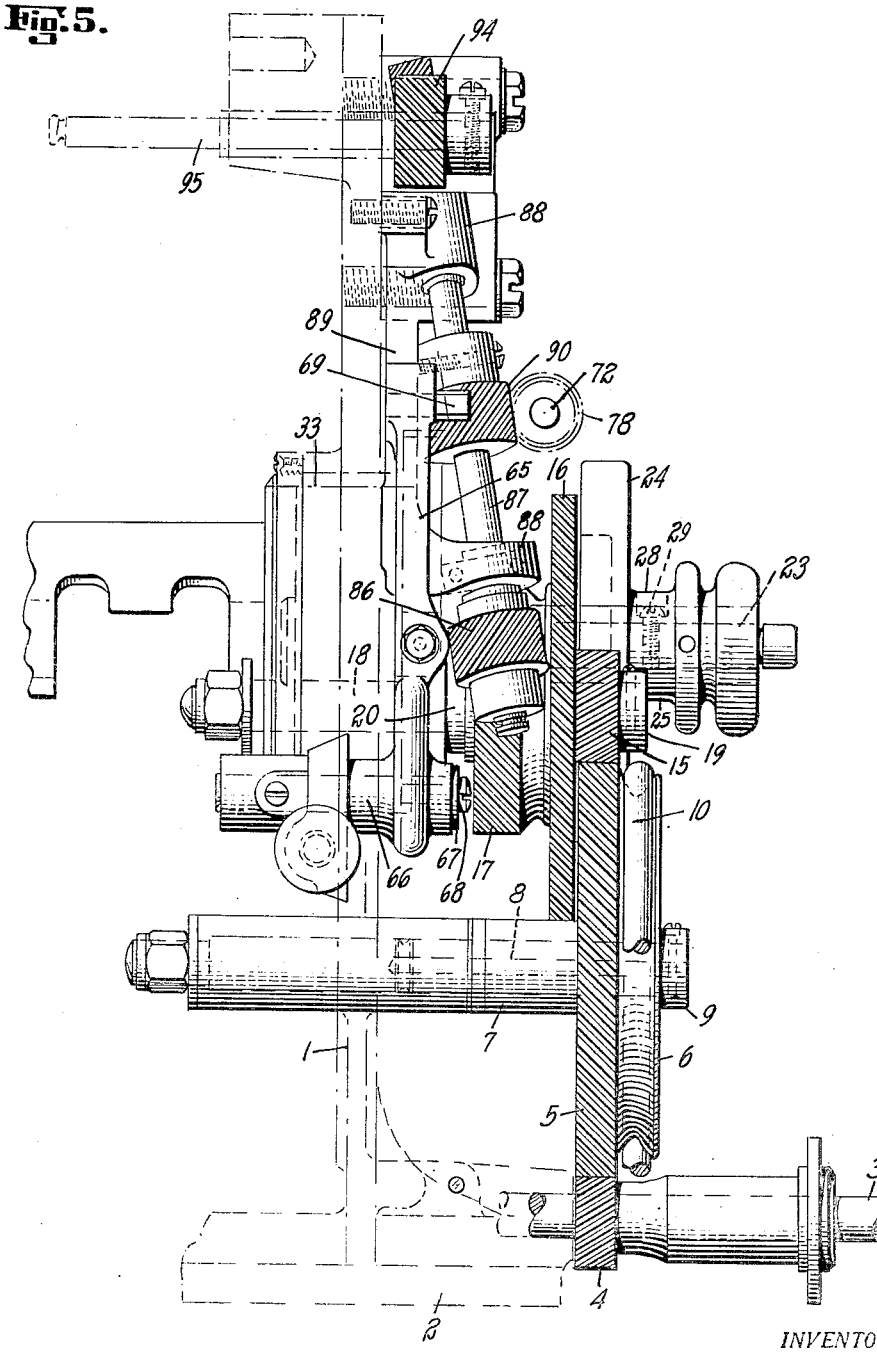

The invention may be better understood by referring to the attached drawings, in which:

Fig. 1 is a side elevational view of the right hand side of a projector having my invention incorporated therein, Fig. 2 is a vertical cross-sectional view taken just to the left of the center plate in substantially the middle of the projector, Fig. 3 is a cross-sectional view on the line 3—3 of Fig. 2, Fig. 4 is a side elevational view of the left hand side of the projector, certain of the parts being omitted so as to more clearly indicate the internal structure, Fig. 5 is a side elevational view taken at right angles to the structure shown in Fig. 4 and looking from the left to the right, Fig. 6 is a cross-sectional view through the intermittent mechanism, Fig. 7 is a cross-sectional view on the line 7—7 of Fig. 6, Fig. 8 is a side elevational view of the fly wheel and the two knobs associated therewith, Fig. 9 is a plan view of the structure shown in Fig. 8, Fig. 10 is a sectional view on the line 10—10 of Fig. 6, and Fig. 11 is a view similar to Fig. 10 but showing the parts in a different position.

The center plate 1 on which all of the gearing is mounted is supported on a base plate 2. Extending into the base plate 2 is a stud 3 on which is mounted a drive pinion 4 secured to a sleeve which is rotated by a motor, not shown. The pinion 4 meshes with and drives a gear 5 integral with a pulley 6. The gear 5 and pulley 6 are integral with a hub 7 rotatably mounted on a shaft 8 and being held thereon by a collar 9. A belt 10 is driven by the pulley 6 and serves as a means to drive the take-up reel, not shown.

The gear 5 is provided with an internal gear 11 which meshes with and drives a pinion 12 which pinion is secured to a shaft 13 which carries the lower feed sprocket 14.

The gear 5 meshes with and drives a pinion 15 which is rigidly secured to a fabricated gear 16 which is integral with a fabricated gear 17 so that the pinion 15 and gears 16 and 17 rotate as a unit. This pinion and gears are rotatably mounted on a shaft 18 and are held against axial movement on the shaft by means of collars 19 and 20 secured to the shaft on opposite sides of the pinion and gears.

The gear 16 meshes with and drives a pinion 21 secured to a sleeve 22 pinned to the shaft 23. A fly wheel 24 is provided with a collar 25 which collar is provided with two knobs 34 and 35 as is shown in Fig. 8. The collar 25 is provided with two cuts 36 and 37 extending for approximately 180° of the circumference of the collar, the collar being entirely cut through for this distance. The collar is also provided with a longitudinally extending slot 38 extending through a portion of the said collar between the knob 34 and the fly wheel 24 and through a portion of the collar between the knobs 34 and 35 and entirely cuts through, in a radial direction, the knob 34 at approximately the mid points of the cuts 36 and 37 so that the portions of the knob 34 adjacent the slot 38 as viewed in Fig. 9 form two separate arms which may be drawn together by a screw 39 so as to clamp the knob 34 and thereby the fly wheel on the sleeve 22. The collar 25 is provided with a hole 28 through which a screw driver may be inserted to engage the screw 29 which extends through the collar 22 and shaft 23. By loosening this screw 29 the fly wheel and the gear 21 and collar 22 may be easily removed from the shaft 23.

The shaft 23 is the driving means for the intermittent mechanism 30 of which the intermittently operated sprocket 31 is the direct driving means for the film. As is well known in the art, the intermittent sprocket engages the film immediately after the film has passed through the film gate 32 and the intermittent sprocket is rotated so as to feed the film downwardly the distance of one picture or one frame and this movement occurs while the projecting light is intercepted by the shutters and thereafter the intermittent sprocket is held stationary while the picture is being projected on the screen. The particular construction of this intermittent mechanism forms no part of the invention, but it might be mentioned in passing that the intermittent mechanism is housed in an intermittent housing 33 in which housing there is a pinion 26 secured to the shaft 23. This pinion 26 is of the same size as and meshes with and drives a pinion 40 journaled in the housing and integral with a cam plate 41 which is provided with the conventional pin 42 and circular plate 43 which extends for 270°, the opening in the said plate being spaced the same number of degrees on each side of the pin 42. The conventional star wheel 44, driven by the pin 42 and thereafter held stationary for 270° by the plate 43, is secured to the intermittent sprocket shaft 45 to which is secured the intermittent sprocket 31. It is, therefore, apparent that when the gear 21 is rotated for 360° the intermittent sprocket will be rotated for 90° during one-fourth of the revolution of the pinion 21 and will be held stationary for the remaining 270° of the rotation of the pinion 21. Since there are four sprocket holes to one frame of a picture and there are 16 sprocket teeth on the intermittent sprocket, the picture will be quickly fed forward for one frame and held stationary thereafter while the picture is being projected and will then be fed forwardly and thereafter held stationary.

Secured to the intermittent housing 33 is an oiling mechanism 46, but as this forms no part of this invention it is not described.

The hub 47 forming a part of the housing 33 is provided with a circular channel 48. A disc 49 is integral with a hub 50 into which hub is inserted the housing 33. The disc 49 is also provided with an inwardly extending flange 51 which is seated in a circular open groove 52 of the housing. Retaining arms 53 are carried by the disc 49 being secured thereto by screws 54. These arms 53 are pivoted on the screws 54 and so that when the disc 49 and its hub 50 are positioned on the intermittent housing the inner ends of these arms may be moved into the channel 48 and the screws then tightened so that the disc 49 is rigidly secured to the housing 33. If desired, a pin 55 may be provided which is secured to the disc 49 and which projects into a hole 56 in the housing. The pin and hole also serve as a means to correctly position the disc 49 on the housing. It is, therefore, apparent that when the disc 49 is rotated, as will hereinafter be described, the housing and the disc 49 rotate as a unit.

The disc 49 is provided with a segmental gear 57 which meshes with and is driven by a pinion 58 secured to a shaft 59 which may be driven by a hand knob 60. This knob is known as the framing knob and by rotating it the pinion 58 and the segmental gear 57 are rotated thereby rotating the disc 49 and the intermittent housing. As a matter of fact the gearing is such that the intermittent sprocket may be rotated a maximum of four teeth which would be sufficient to move the film to any conceivable position within the length of one picture. It is, therefore, apparent that when the gearing is driven by the drive pinion 4 the pinion 21 is rotated and for each complete rotation of the said pinion the intermittent sprocket 31 is rotated a distance of one frame while the intermittent housing 33 remains stationary. If however, the said gearing remains stationary and the framing knob 60 were rotated, the intermittent housing would be rotated while the pinion 21 is held stationary, the net result being that the intermittent pinion 31 is rotated forwardly or backwardly. When the framing knob 60 is rotated this movement would not be imparted to the gear 21 for otherwise this would result in rotating the pinion 4 which is rotated solely by the motor. This means that if the fly wheel 24, the shaft 23 and the pinion 26 remained stationary, the intermittent housing 33 might be rotated by the framing knob 60. The pinion would, therefore, act as a sun gear while the gear 40 would rotate around it as a planet gear thereby rotating the disc of the star wheel 44 and also rotating the star wheel 44 and the sprocket 31 so as to move the film upwardly or downwardly.

The disc 49 is provided with a cam surface 61 extending for approximately 45° above and below the point where it contacts the roller 62 as viewed in Fig. 4, the low point of the cam surface being approximately 45° above the said contact point. The roller 62 is carried by a push rod 63 which terminates at its left hand end as viewed in Fig. 4 in a flat surface which is engaged by a V-shaped block 64 carried by a lever 65 pivoted on a shaft 66, it being held in place thereon by means of a washer 67 and a screw 68, which screw is screwed into the shaft 66. The upper end of the lever 65 is provided with a pin 69, as shown in Fig. 3, which projects through a slot in the housing 70 integral with a bracket 71 which is attached to the center plate 1. The housing, therefore, is stationary but it surrounds the shutter shaft 72, it being provided with a cylindrical bore 73. Slidable within the bore 73 is a piston 74 which is provided with a circular channel 75 into which projects the said pin 69 at the upper end of the lever 65. The said piston is urged to the right as viewed in Fig. 2 by the spring 76 coiled about the shaft 72 and bearing against the said piston, the other end of said spring bearing against a collar 77.

A worm gear 78 is provided with a sleeve 79 and is keyed on the shaft 72 by means of a key 80 so that the said worm gear 78 will rotate with the shaft 72 but is capable of slidable motion on the said shaft. Screwed to the sleeve 79 is a stop 83 and a ball bearing assembly 81 is interposed between the said stop 83 and a plate 82 screwed or otherwise securely fastened to the said piston. The said piston is held against rotation by means of a pin 84 which projects through a slot 85 in the housing 70 and into the piston therein.

The spring 76 at all times tends to push the piston to the right as viewed in Fig. 2 and thereby pushes the roller 62 against the cam surface 61. By rotating the segmental gear and cam surface 61 we can thereby move the piston to the right or the left as viewed in Fig. 2, and thereby move the worm gear 78 to the right or left as viewed in the said figure. At the same time, however, the film itself would have been moved upwardly or downwardly by the rotation of the segmental gear 57.

It will be remembered that the gear 17 is constantly rotated by the driving mechanism when the driving mechanism is in operation. This gear 17 meshes with and drives a pinion 86 which is secured to an obliquely extending shaft 87 mounted in bearings 88 in a fixed bracket 89, which bracket is secured to the center plate 1. Secured to the shaft 87 is a worm pinion 90 which meshes with and drives the worm gear 78 which, it would be remembered, is splined to the shutter shaft 72 to which is secured the shutters 91 and 92.

Of course, it is well understood in the art that the shutters are so placed on the shaft 72 that they will cut off the beam of light by which the picture is projected immediately before the intermittent sprocket feeds the film forwardly and will continue to cut off the light until after the said sprocket has finished its feeding movement.

Also secured to the shaft 87 is a worm 93 which meshes with and drives a gear 94 secured to a shaft 95 on which the upper continuous feed sprocket 96 is mounted.

The film normally passes downwardly through a shute 97, then beneath the upper continuous feed sprocket 96 and between the said sprocket and a guide 98 and downwardly past the film gate 32 in which is the film aperture, and between the intermittent sprocket 31 and a shoe 99 forming a part of the film gate mechanism and thence over the lower feed sprocket 14 and downwardly out of the projector and into the usual sound mechanism.

It is, therefore, apparent that in the normal operation of the machine the upper sprocket 96 and the lower sprocket 14 will be rotated continuously while the intermittent sprocket 31 will be rotated intermittently. Of course, loops are made in the film above and below the film gate mechanism so as to take care of this differential in the feed. While thus being normally operated the worm gear 78 is not reciprocated on the shaft 72 and will not be unless we desire to frame the picture.

If it is desired to frame the picture and the framing knob is rotated so as to move the worm gear 78 longitudinally of the shaft 72, it is, of course, apparent from an inspection of Fig. 4 that the longitudinal movement of the worm gear 78 would tend to impart rotation to the worm pinion 90, but such movement is not possible for this movement would be communicated back to advance or retard the motor driven pinion 4. Since therefore the pinion 90 cannot be rotated by the longitudinal movement of the worm gear 78, the shaft 72 is rotated and rotates the shutters.

In this specification mention has been made of the number of teeth on the intermittent sprocket, the number of teeth moved on one movement of the intermittent sprocket, the number of degrees of rotation of the intermittent sprocket by actuating the framing knob and other specific figures have been given in regard to certain parts. It is to be understood, however, that all such specific mention of the number of teeth and the like are to be taken by way of illustration and are used because they are particularly suited to the motion picture projector as at present constructed. It is conceivable, however, that the number of sprocket teeth corresponding to the length of one picture on the film might be more or less than four, and of course, the number of sprocket teeth on the intermittent sprocket would be accordingly changed. The framing knob might be rotated so as to rotate the intermittent sprocket more or less than 90°. Even with the modern projector we could still frame a picture, regardless of any position it might be in, to its correct position by rotating the framing knob so as to move the intermittent sprocket considerable less than 90°. It might be further mentioned that the gearing which is shown is such that the upper and lower feed sprockets 96 and 14 rotate 360 R. P. M. while the fly wheel rotates 1440 R. P. M., but no importance should be attached to the exact number of revolutions per minute of any of these parts, except that it is important that the upper and lower feed sprockets should feed the film forward uniformly and at the same speed, and that in the normal operation of the projector the intermittent sprocket should rotate at a speed which in the aggregate would feed the film in conformity with the aggregate amount of film fed by the continuously rotating sprocket so as to maintain the upper and lower loops. The mechanism whereby the shutter shaft 72 is synchronously moved with the intermittent sprocket 31 is what I call the synchronizing mechanism.

The operation of the machine is as follows. The power driven pinion 4 rotates the gear 5 and through the internal gear 11 the pinion 12 is rotated so as to impart 360 R. P. M. to the lower feed sprocket 14. The gear 5 drives the pinion 15 and thereby the gears 16 and 17. The gear 17 drives the pinion 86 and thereby the gears 90 and 93. The gear 93 drives the upper feed sprocket 96 and the gearing shown is such that both the continuous feed sprockets 96 and 14 rotate 360 R. P. M., but as above stated, this rotation may be varied to suit conditions. The pinion 90 rotates the worm gear 78 and through the key 80 rotates the shutter shaft 72, thereby rotating the shutters 91 and 92. The gear 16 rotates the pinion 21 at 1440 R. P. M. and through the intermittent mechanism the intermittent sprocket is driven 1440 one-fourth revolutions or 360 complete revolutions, it being advanced 1440 times per minute for a distance of one frame.

The above description is the normal operation of the machine when the picture is properly framed. It is possible, however, that the picture is not properly framed, for instance, three-fourths of the upper picture may be shown on the screen with one-fourth of the succeeding picture. In that case all that is necessary to be done is to rotate the framing knob 60 so as to move the intermittent sprocket 31 and simultaneously and correspondingly rotate the shutters until the picture is properly framed. While the framing is normally done with the picture being projected on the screen so that the drive gearing is rotated, the framing mechanism might be better understood if we assume that the machine was not in operation and the drive gearing was held stationary by the drag of the motor. In that case, the framing knob would be turned so as to rotate the segmental gear 57 and the entire intermittent housing while the pinions 21 and 39 are held stationary. Since the pinion 39 is held stationary, the pinion 40 runs around it like a planet gear when the housing is rotated, thereby moving the axis of the pinion 40 around the center of the shaft 45 so that the circular part of the disc 43 rotates the star wheel pinion 44 the same number of degrees as the housing; that is, if the housing is rotated $x$ degrees, the pinion 31 is also rotated $x$ degrees, but at the same time the pin 42 is being rotated so as to increase or decrease the number of degrees of rotation necessary for the said pin to enter one of the slots in the star wheel. The gearing between the stationary pinion 90 and the slidable worm gear 78 is such that the shaft 72 will be rotated this same number of degrees so that the shutter will always be in position to cut off the beam of light at the same time that the pin 42 enters one of the slots of the star wheel.

Of course, framing takes place with the machine in operation, but in that case the movements described on the supposition that the machine was standing still would simply be added to or subtracted from the normal rotation of the gears involved.

I realize that many changes may be made in the specific form of the invention which is shown by way of illustration in the attached drawings and not by way of limitation, and I, therefore, desire to claim the same broadly, except as I may limit myself in the attached claims.

Having now described my invention, I claim:

1. In a framing mechanism, an intermittent sprocket, a shutter, a shaft on which the shutter is mounted, synchronous mechanism whereby said shutter and sprocket are actuated, said mechanism including a pivoted lever, and a piston slidable on said shaft and operatively connected with said lever and a spring to maintain said piston at all times in engagement with the lever.

2. In a framing mechanism, an intermittent sprocket, a shutter, a shaft on which the shutter is mounted, a piston slidable on said shaft, a lever to move said piston in one direction and a spring urging said piston in the opposite direction and into engagement with the lever, means whereby the movement of said piston longitudinally of said shaft rotates said shutter and actuating means to actuate said lever and to rotate said sprocket an amount corresponding to the amount of rotation to the shutter.

3. In a framing mechanism, an intermittent sprocket, a shutter, a shaft on which the shutter is mounted, a piston slidable on said shaft, means to hold said piston against rotation with said shaft, a lever to move said piston in one direction and a spring urging said piston in the opposite direction and against said lever and means to rotate said shutter by the movement of said piston and to rotate said sprocket in a corresponding amount.

4. In a framing mechanism, an intermittent sprocket, a shutter, a shaft on which the shutter is mounted, a piston slidable on said shaft, means to hold said piston against rotation with said shaft, an anti-friction bearing between said piston and said shaft, a lever to move said piston in one direction and a spring urging said piston in the opposite direction and into engagement with the lever, means whereby the movement of said piston longitudinally of said shaft rotates said shutter and actuating means to actuate said lever and to rotate said sprocket an amount corresponding to the amount of rotation to the shutter.

5. In a framing mechanism, an intermittent sprocket, a shutter, a shaft on which the shutter is mounted, a piston slidable on said shaft, a lever to move said piston in one direction, a pin carried by said lever and extending within a circumferential slot within said piston so that the movement of said lever is imparted to said piston and the movement of the piston is imparted to the lever, a spring urging said piston in the opposite direction from the movement of the piston imparted by the lever and into engagement with the lever, means whereby the movement of the piston longitudinally of said shaft rotates said shutter and actuating means to actuate said lever and to rotate said sprocket an amount corresponding to the amount of rotation of the shutter.

6. In a framing mechanism, an intermittent sprocket, a shutter, a shaft on which the shutter is mounted, a piston slidable on said shaft, a lever to move said piston in one direction, and a spring urging said piston in the opposite direction and into engagement with the lever, means whereby the movement of said piston longitudinally of said shaft rotates said shutter, said means including a worm gear splined to said shaft and actuating means to actuate said lever and to rotate said sprocket an amount corresponding to the amount of rotation of the shutter.

7. In a framing mechanism, an intermittent sprocket, a shutter, a shaft on which the shutter is mounted, a piston slidable on said shaft, a lever to move said piston in one direction and a spring to move said piston in the opposite direction into engagement with the lever, means whereby the movement of said piston longitudinally of said shaft rotates said shutter, actuating means including a manually operatable knob to actuate said lever, and to rotate said sprocket an amount corresponding to the amount of rotation of the shutter.

8. In a framing mechanism, an intermittent sprocket, a shutter, a shaft on which the shutter is mounted, a piston slidable on the shaft, means whereby said piston is moved longitudinally of the shaft, said means including a lever and spring, said spring always maintaining said piston against said lever, means whereby the movement of the piston longitudinally of said shaft rotates said shutter, actuating means for said sprocket and lever including a manually operated knob, a cam disc actuated by said knob and driving connections between said cam disc and said sprocket and lever.

9. In a motion picture projector, a shutter, a shaft on which the shutter is mounted, a piston slidable on the shaft, means whereby when the piston is moved longitudinally of the shaft the shaft will be correspondingly rotated, an intermittent sprocket, and means whereby the piston is moved and the sprocket simultaneously rotated so that the shutter and the sprocket are synchronously operated said last-named means including a lever to move said piston in one direction and a spring to move it in the other direction and to maintain said piston at all times in engagement with the said lever.

10. In a motion picture projector, a shutter, a shaft on which the shutter is mounted, a piston slidable on the shaft, means whereby when the piston is moved longitudinally of the shaft the shaft will be correspondingly rotated, an intermittent sprocket, a framing knob, a cam disc rotated by said knob, a push rod controlled by said cam disc, a pivoted lever operatively connected to said piston, said push rod bearing against said lever intermediate its pivot point and its point of connection with the piston whereby when the cam disc is partially rotated in one direction the piston will be moved, a spring urging the piston in the opposite direction and into engagement with the lever, and means connecting the sprocket and cam disc.

EWALD BOECKING.